United States Patent Office 3,448,611
Patented June 10, 1969

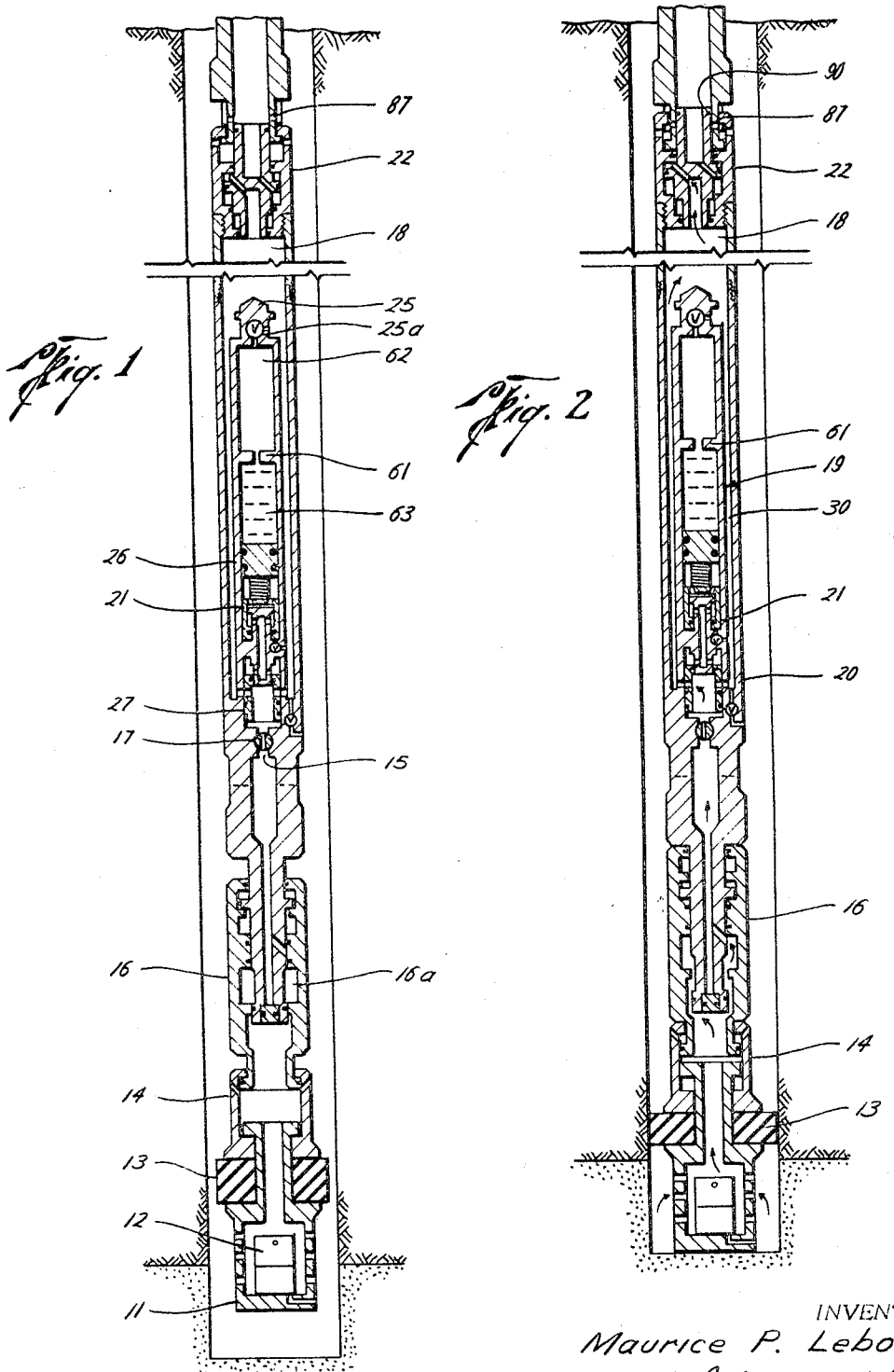

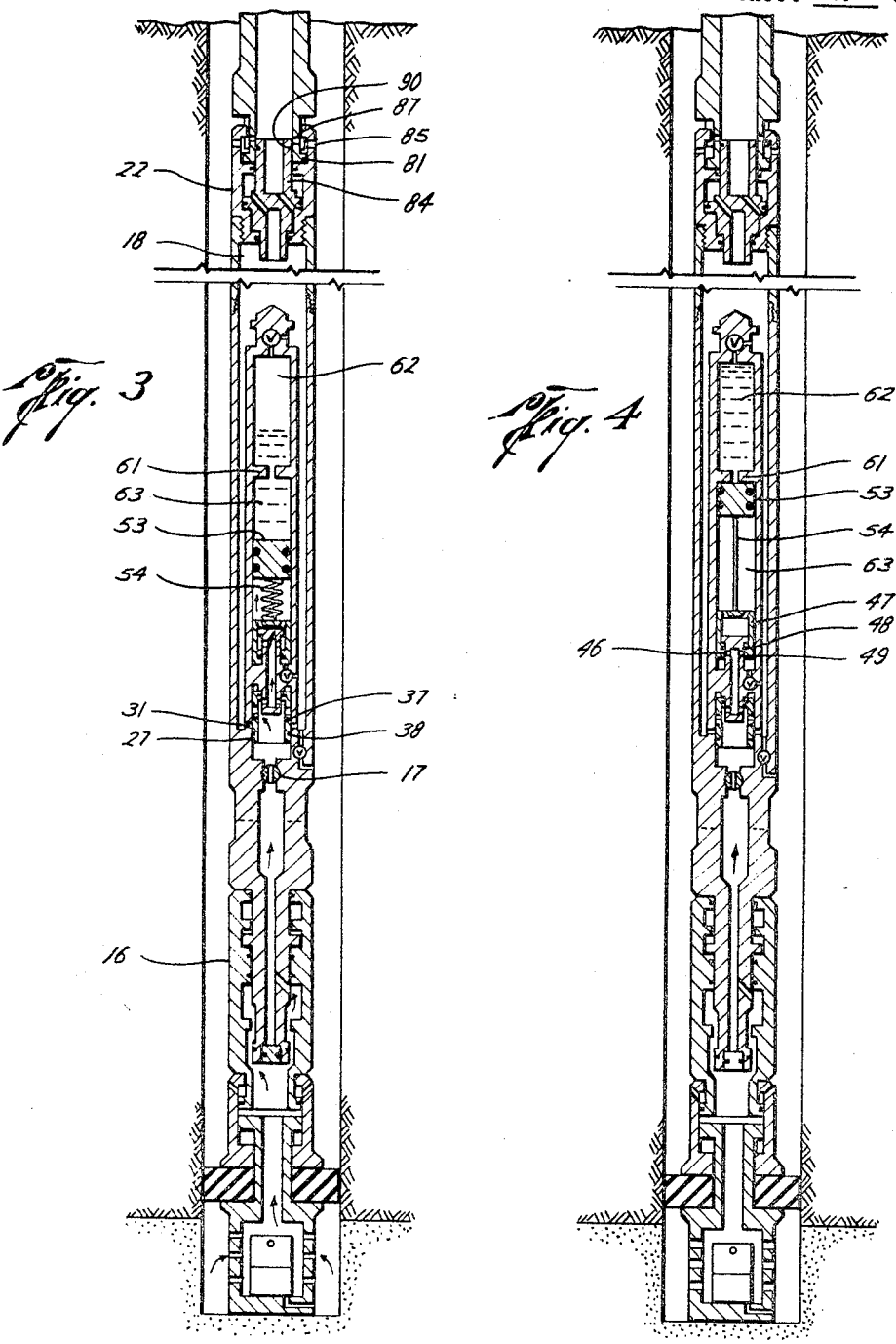

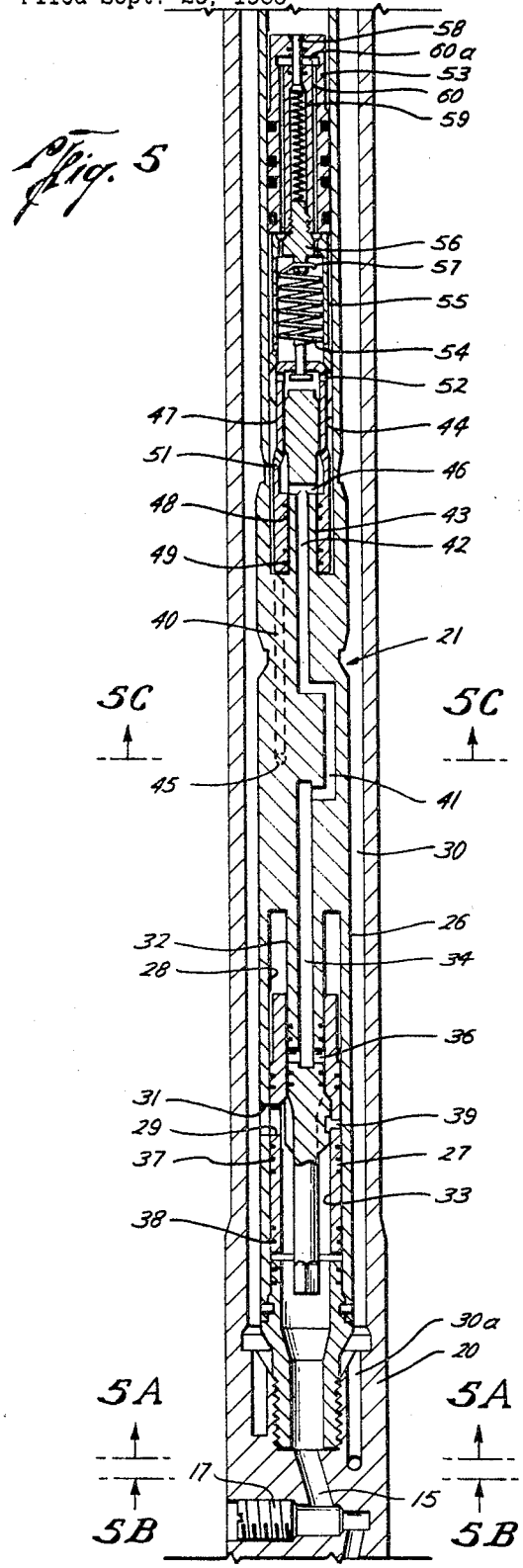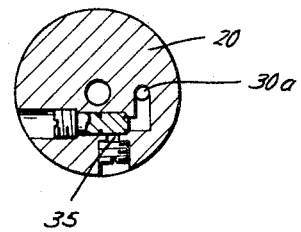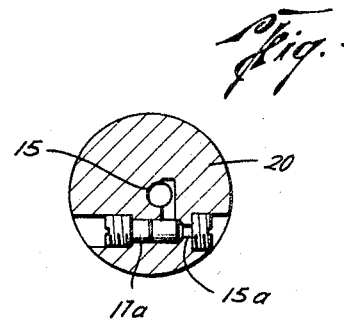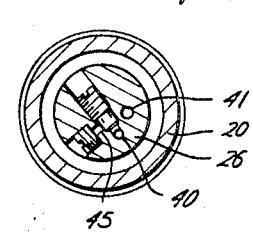

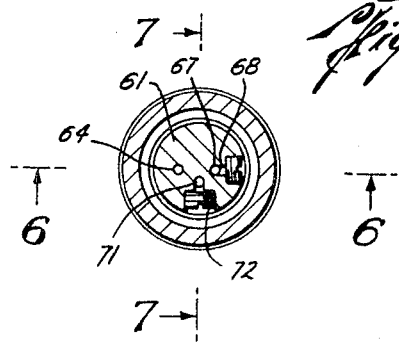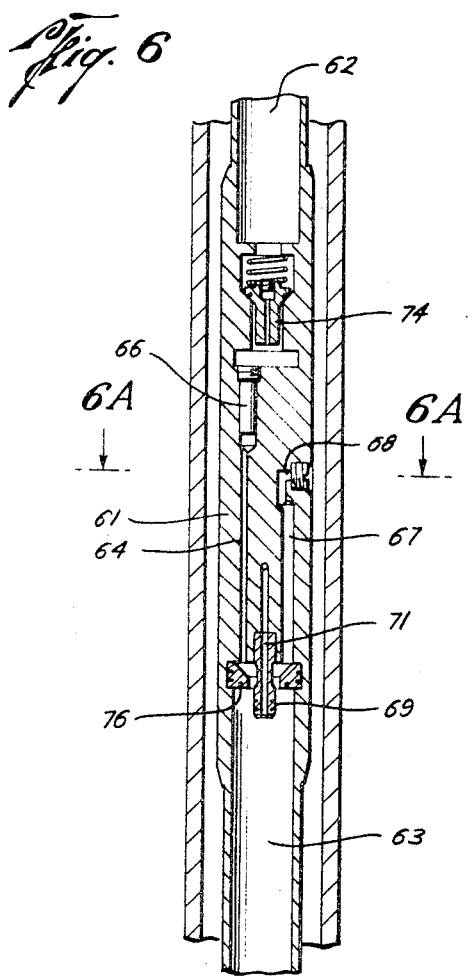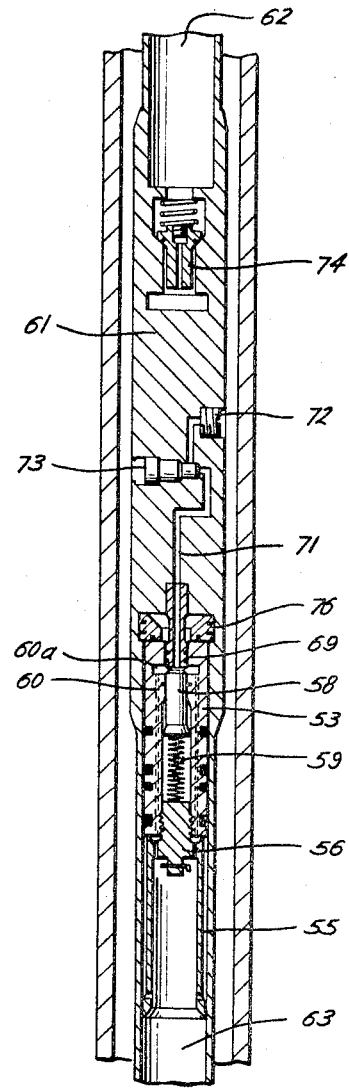

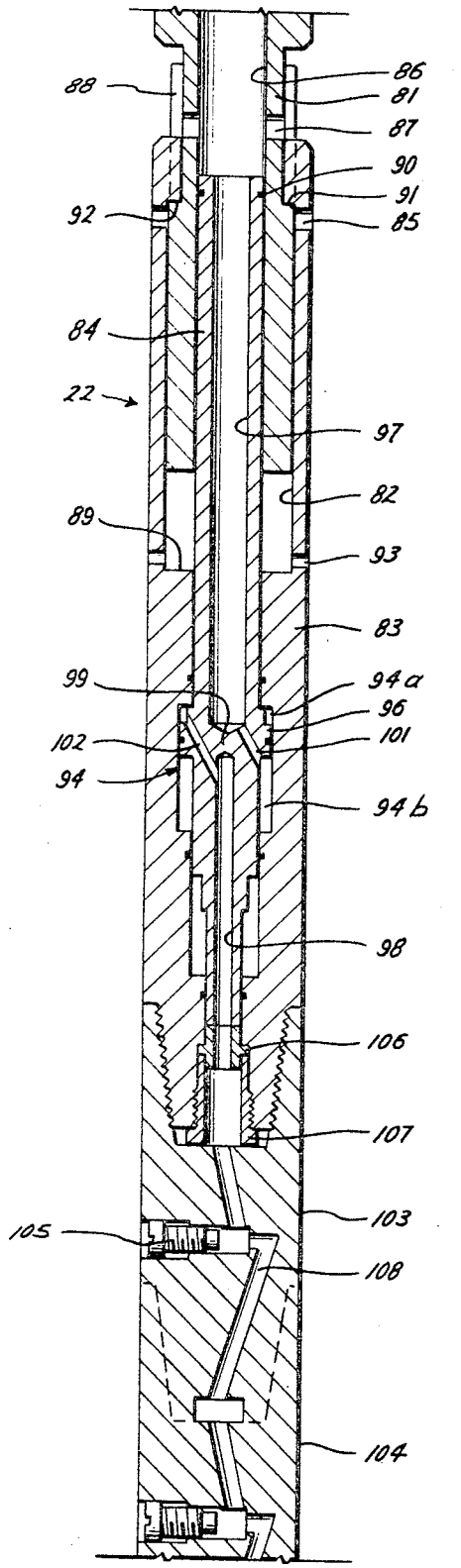

3,448,611
METHOD AND APPARATUS FOR FORMATION TESTING
Maurice P. Lebourg, Houston, Tex., assignor to Schlumberger Technology Corporation, Houston, Tex., a corporation of Texas
Filed Sept. 29, 1966, Ser. No. 582,956
Int. Cl. E21b 47/06, 47/12
U.S. Cl. 73—151                28 Claims

ABSTRACT OF THE DISCLOSURE

Methods and apparatus for drill stem testing in a well bore, including a packer, a test valve, and first and second sample chambers connected to said test valve by a passage. A valve mechanism in the passage is arranged to open one chamber while closing the other, and subsequently, to close said one chamber while opening said other chamber. An indicator means between one of the sample chambers and the drill stem provides a signal to the top of the well bore when a predetermined pressure level has developed in said one sample chamber.

---

This invention relates to formation testing and, more particularly, to formation testing methods and apparatus which obtain representative fluid samples from a well bore.

During the drilling of a well, the operator may at some time desire to test a section of the well for production potential. To do this, a testing tool having a normally closed tester valve and a packer is inserted into the well at the lower end of a string of pipe or tubing. The packer is disposed at a location just above the section to be tested and is expanded to close off the bore of the well. Thus, the section for test is isolated from a control fluid which is usually mud. The testing tool includes a pressure recorder which measures the pressure of the isolated formation during the testing operation. The tester valve is opened to permit formation fluids to flow into the string of tubing. This flow may appear at the surface if the pressures are great enough. The tester valve is then closed and a final pressure is recorded.

When the string of tubing is brought to the surface and sections of tubing and tools are removed from the string of tubing, the formation fluids in the tubing are exposed at the surface or floor of the drilling platform. Such exposure of formation fluids may be undesirable under certain circumstances for reasons of safety or secrecy. For this reason, various methods for testing wells under such conditions have been developed. These methods are commonly referred to as "tight hole" or "closed chamber" testing techniques and normally utilize apparatus in the testing operation to prevent uncontrolled flow of formation fluids at the surface. In addition, by means of these techniques, the formation fluids are confined to closed containers so that the results of the test are confidential. The present tight hole testing techniques utilize apparatus which traps the initial production of formation fluids in a closed or segregated chamber in the string of tubing. When it is believed that the chamber is filled, the tester valve is closed and a final shut-in pressure is recorded.

The problem of obtaining a fluid sample qualitatively representative of the reservoir fluid is extremely difficult. The major difficulty is concerned with the necessity of creating a pressure draw down which may cause the reservoir fluid to give off its lighter components as gas. Thus, the rate of flow of the various phases through the formation differs from the ratio of occurrence in the formation. Consequently, the fluid obtained in the sample chamber may deviate from the proper relationship between the gas and liquid in the formation.

Another problem associated with closed chamber testing is that it may be impossible to determine at the surface when or if the chamber is filled since the recovery is limited or confined to a closed section of the tool string.

Additionally, a study of pressure build up in a closed chamber may be hampered by the difficulty in defining the flow time, i.e., the time it takes for the formation to fill a certain volume of the sample chamber. Different methods are available for estimating this time from other observed data. However, in the case of closed chamber testing, the flow time cannot easily be identified because compressibility and flowing gas oil ratio play such an important part in both the flow period and build up period. This particular problem is pointed out in more detail in an article entitled "Tight Hole and Closed Chamber Testing" from the Journal of Canadian Petroleum Technology, Fall 1964.

Accordingly, it is an object of the present invention to provide new and improved methods and apparatus for conducting a drill stem test which provides a sample representative of the fluid as it exists in the formation.

Therefore, in accordance with the present invention, in a drill stem test, the fluid recovery is limited to a portion of the drill pipe which is closed off prior to retrieving the sections of pipe to the earth's surface. The formation fluid enters the sections of pipe and if sufficient fluids are present, the fluids normally flow until the sections are filled. At such time an indication is received at the surface that the pipe sections forming a first chamber are filled whereupon a valve is automatically closed to shut off such pipe sections and a second valve opened which permits the formation fluid to flow into a second chamber against a predetermined pressure. Upon filling of such second chamber, the second valve is closed and the formation is shut in. Thereafter, the test valve is closed and the string of tools is retrieved to the surface. Fluid in the sections of drill pipe forming the first chamber may be isolated between the ends of the sections by closing valves at each end of the sections or the fluid may be reversed out of the chamber into a closed receptacle to maintain the nature of the recovery as a secret. The second chamber which contains the most representative sample of the formation fluid may be removed from the string of tools for transfer to a place where the fluid sample may be analyzed.

The novel features of the present invention are set forth with particularity in the appended claims. The present invention, both as to its organization and manner of operation together with further objects and advantages thereof, may best be understood by way of illustration and example of certain embodiments when taken in conjunction with the accompanying drawings in which:

FIGURES 1–5 show schematic illustrations of the various operational stages of a string of well tools embodying the principles of the present invention;

FIGURES 5A, 5B and 5C are cross sectional views of the indicated sections of FIGURE 5;

FIGURE 6 is a detailed sectional view of a portion of the sample section of the tool;

FIGURE 6A is a cross sectional view taken along lines 6A—6A of FIGURE 6;

FIGURE 7 is a sectonal view taken along lines 7—7 of FIGURE 6A; and

FIGURE 8 is a sectional view of an indicator valve used in the tool string.

Referring first to FIGURES 1–4, the string of tools is shown having a perforated anchor 11 and pressure recorder 12 at its lower end. A selectively operable packer 13 is positioned above the perforated anchor. A bypass valve 14 is included in the string above the packer to permit fluid flow around the packer when the tool string is being run into the well. Next, a drill steam testing tool 16 is positioned above the bypass valve 14. The tools thus far described as making up the string are shown in greater detail in applicant's copending patent application Ser. No. 333,224.

A valve 17 which will hereinafter be referred to as a tight-hole sub is positioned within a longitudinal passage 15 above the test tool, the valve being shown in greater detail in FIGURES 5B and 8. Above the tight-hole sub is a sampling section of the tool which is comprised of a first or upper sample chamber 18 made up of one or more sections of drill pipe and a second or lower sample section 19. Tight-hole subs such as those shown in FIGURE 8 are positioned at each end of the one or more sections of drill pipe forming the upper sample chamber 18. Above the upper sample chamber is an indicator and bypass valve 22 which is also shown in greater detail in FIGURE 8.

The lower sample section 19 and valve mechanism 21 associated therewith are incorporated into a removable housing section 26 which is threadedly coupled at its lower end to the tool housing 20. Attachment means 25 are provided at the upper end of the housing to permit easy removal of the sample section and valve mechanism from the tool string. A valved passageway 25a (shown schematically in FIGURES 1–4) is provided in the upper end of the sample section 19.

Referring to FIGURE 5, the valve mechanism 21 includes a lower sleeve valve 27 slidably positioned within a lower bore 28 in the valve housing. Ports 29 are formed through the wall of the sleeve valve 27 and as shown in FIGURES 1 and 5 are normally in register with ports 31 in the valve housing. Ports 31 in turn are in communication with an annular space 30 between the valve housing 26 and the tool housing 20. The annular space 30 communicates with the chamber 18 formed by sections of drill pipe. The annular space 30 also communicates at its lower end with a downwardly extending passage 30a which, in turn, connects with a plugged transverse port 35 and valve (see FIGURE 5A) which provide communication with the exterior of the tool housing 20. FIGURE 5B shows a cross section of the tight-hole sub which provides valve means 17 for opening and closing passage 15. The sub includes a valve 17a for opening and closing a passage 15a to the exterior of the sub.

The sleeve valve 27 is slidably positioned about a depending portion 32 of the valve body which is axially positioned within a bore 33 in the sleeve valve. A longitudinal passageway 34 is formed within the depending portion 32, with the passageway 34 extending upwardly through the valve housing. Ports 36 in the depending portion 32 provide communication between the bore 33 in the sleeve and passageway 34 in the housing. Seal means 37, 38 are positioned on the outer wall of the sleeve to seal off and thereby close ports 31 in the housing when the sleeve moves upwardly to a higher position in the bore 28 as shown in FIGURE 3. Shear pins 39 or the like are connected between the sleeve 27 and the depending housing portion 32. The pins 39 normally maintain the sleeve ports 29 aligned with housing ports 31. The pins 39 are shearable to render the sleeve 27 movable relative to the housing upon the application of sufficient pressure to the lower end of the sleeve.

Passageway 34 in the valve housing connects with intermediate passageway 41 which, in turn, connects with longitudinal passageway 42 formed in an upwardly extending portion 43 of valve housing 26. The portion 43 is axially positioned within an upper bore 44 and is sized to provide a space between the portion 43 and the bore 44. A passageway 40, which is shown in dotted lines in FIGURE 5, extends downwardly within the housing 26 and connects with a valved passage 45 (also see FIGURE 5C) leading to the exterior of the valve housing 26. The upper end of the passageway 42 extending through the valve housing portion 43 has ports 46 communicating with the bore 44 of the valve housing. An upper sleeve valve 47 is slidably positioned about the upwardly extending portion 43 and likewise has seal means 48, 49 thereon for closing off the ports 46 when the sleeve valve 47 is moved upwardly relative to the upwardly extending portion 43 of the valve housing. Ports 51 in the sleeve valve 47 are normally positioned opposite ports 46 (as shown in FIGURE 5) to provide communication between the passageway 42 and bore 44. An upper set of ports 52 connect the bore 44 with the upper interior of the sleeve valve above the upwardly extending portion 43.

A segregating piston 53 is slidable within the bore 44 and means 54 are provided to connect the piston 53 with the upper sleeve valve 47. In the preferred embodiment of the apparatus as described herein, such means for connecting the piston and sleeve valve is an extendible stainless steel wire rope. Upon sufficient upward movement of the piston, the wire rope 54 is placed under sufficient tension to move the sleeve valve 47 upwardly where seals 48 and 49 straddle and thereby close off the ports 46 in the upwardly extending portion 43 of the valve housing. The piston 53 includes a cable catcher 55 extending downwardly therefrom about the coil of stainless steel cable 54. A piston cable clevis 56 is provided at the lower end of the piston and attaches to the upper end of the cable by means of a shear pin 57. A piston valve 58 is slidably received in a bore through the upper end of the piston. A segregator piston spring 59 is positioned between the piston valve 58 and the piston cable clevis. The spring 59 normally urges the piston valve 58 in an upward position as shown in FIGURE 5. Passageways 60 extend upwardly through the piston cable clevis and the piston and communicate with transverse passages 60A near the upper end of the piston and communicating with the bore in which the piston valve 58 is slidably received.

Referring to FIGURES 1–4, the lower sample section 19 has an intermediate section 61 dividing the sample section into upper and lower chambers 62 and 63, respectively. This intermediate section 61 dividing the chamber is shown in greater detail in FIGURES 6 and 7 of the drawings. The intermediate section has a longitudinal passageway 64 connecting the upper and lower chambers 62 and 63. A choke 66 is positioned in the passageway to meter fluids flowing from chamber 63 into chamber 62. A check valve 74 is also positioned at the upper end of the intermediate section to permit fluids flowing through passageway 64 and choke 66 to pass into the upper chambers 62 while retarding the flow of fluids in an opposite direction.

Another longitudinal passageway 67 extends part way through the intermediate section from its lower end to a point midway up the section communicating with a plugged transverse bore 68. A transfer mandrel 69 is centrally positioned in the intermediate section and extends downwardly therefrom. A third longitudinal passage 71 (see also FIGURE 7) extends upwardly through the center of the transfer mandrel and the intermediate section to a point part way through the intermediate section and communicates at its upper end with a plugged bore 72. A valve 73 is positioned in the intermediate section to intercept the passageway 71 and thereby provide a means for opening and closing the passageway. The valve 73 is operable by rotation from the exterior of the intermediate section. At the lower end of the intermediate section, an annular seating flange 76 projects downwardly from the end of the intermediate section and spaced outwardly from the transfer mandrel 69. The space around the transfer mandrel between the mandrel and the seating flange provides for fluid communication between chamber 63 and the lower end of passageways 64 and 67.

The valved passageway 25a in the upper end of chamber 62 provides communication between the interior of the upper chamber and the exterior of the lower sampling section 19. This valve is selectively operable from the exterior of the engagement means 25.

FIGURE 8 shows a detailed view of the indicator valve sub 22 schematically shown in FIGURES 1–4 positioned above the upper sampling section 62. The indicator valve has an upper mandrel 81 slidably positioned within an axial bore 82 extending through the sub housing 83. A lower mandrel 84 is slidably positioned within a bore 86 extending through the upper mandrel 81. Splines 88 on the upper mandrel slidably engage with spline grooves in the housing 83 to prevent relative rotation therebetween. A shoulder 89 is formed in the bore 82 of housing 83 and limits downward movement of the upper mandrel within the bore 82.

Ports 87 are formed through the wall of the upper mandrel communicating between the bore 86 and the exterior of the mandrel. An enlarged portion is formed on the lower part of the upper mandrel forming a shoulder 91 at the upper end of the enlarged portion. A flange 92 extends inwardly from the upper end of the housing 82 to form an abutment for engaging the shoulder 91 and thereby limiting upward movement of the upper mandrel 81 within housing 82. Ports 85 are formed through the housing just below the flange portion 92 to provide communication between the exterior of the housing and the bore 82 of the housing. An annular seal means 90 is provided at the upper end of the lower mandrel and sealingly engages the bore 86 formed in the upper mandrel. Ports 93 are formed in the housing wall to provide fluid communication between the interior bore 82 of the housing below the mandrel and the exterior of the housing.

The lower end of the housing has a recessed portion in its interior wall which forms a chamber 94 therein. A flange extends outwardly from the lower mandrel to form an annular piston 96 which is slidably received within the chamber 94 to divide the chamber into upper and lower portions 94a and 94b, respectively. The lower mandrel 84 is provided with upper and lower bores 97 and 98 extending inwardly from its ends and separated by an intermediate portion 99. A passageway 101 formed in the portion 99 connects the upper bore 97 of the lower mandrel with the chamber 94b below the annular piston 96. Another passageway 102 in the portion 99 connects the lower bore 98 of the lower mandrel with the chamber 94a above the annular piston 96. The lower bore 98 of the lower mandrel is in communication with the upper sampling section 62 by means of longitudinal passageway formed through tight-hole subs 103 and 104. A shear ring 106 is placed at the lower end of the lower mandrel and limits downward movement of the lower mandrel with respect to the housing 83. A shear ring stop 107 holds the shear ring against the housing 83. Fluid pressure is communicated from the lower bore 98 through the passageway 102 to the upper side of the annular piston 96. The pressure is effective upon reaching a predetermined level to move the lower mandrel downwardly within the housing, shearing the shear ring 106 positioned at the lower end of the lower mandrel.

The tight-hole sub 103, 104 provide a means for isolating interior sections of a tool string by manipulation of a valve 105 having a control portion exposed to the exterior of the tool string. The valve 105 opens and closes a longitudinal passageway 108 extending through the sub. Another valve and passageway in the sub (as shown in FIGURE 5B) provide a means for opening the passageway 108 to the exterior of the tool for bleeding or draining fluid from the interior of the tool string. Details of the sub are disclosed in the U.S. Patent No. 3,254,710.

In the operation of the apparatus as described herein, the string of tools is lowered into the well bore to a position at which a formation is to be tested. It is pointed out tha various types of packer arrangements may be utilized such as a straddle packer in the event the formation is considerably above the bottom end of the well bore. In the running-in condition as illustrated in FIGURE 1 of the drawings, the ports 87 in the indicator sub mandrel permit fluid communication between the well bore and the interior of the tubing string above the string of tools. Likewise the bypass valve 14 at the lower end of the tool string is open and the tester valve 16 is closed. The lower sleeve valve 27 in the valve system 21 is in its downward position to provide communication between the tester valve 16 and the upper sample chamber 18 formed by sections of pipe. The valve in the tight-hole subs as at 17, 103 and 104 and between sections of drill pipe are opened to permit fluid flow through the longitudinal passage upwardly through the valves.

FIGURE 2 shows the string of tools at the beginning of the testing operation. The anchor has engaged the lower end of the borehole and the bypass valve in the bypass section 14 is shut. The indicator valve at the upper end of the tool is closed by the application of the weight of the tubing above the indicator valve. The tubing weight causes the indicator valve mandrel 81 (FIGURE 8) to move downwardly with respect to the housing, placing the port 87 in the mandrel below the seal 90 in the lower mandrel 84. Before the bypass valve and indicator valve are closed, well fluid may be circulated through the drill stem to determine the pressure necessary to maintain such circulation. The packer 13 is then expanded to isolate the formation to be tested from the rest of the well bore. Pressure is then applied to the annular space in the well bore above the packer to provide a pressure on the drill fluid which is greater than the previously determined circulating pressure.

At this point, the tester valve is open as shown in FIGURE 2 to receive formation fluid within the tool string as indicated by the arrows in FIGURE 2. If sufficient formation pressure is available, the fluids will flow upwardly through the drill pipe forming chamber 18 to the indicator sub. The pressure generated by fluids flowing into the drill pipe is communicated through passageway 102 in the indicator sub to the upper side of the annular piston 96 on the lower mandrel 84. The expected formation pressure is calculated before the test and the shear ring 106 which prevents the indicator sub from operating is arranged to be ruptured by a pressure within the expected range of formation pressures in the formation to be tested. When the pressure in the upper chamber 18 has built up to the shear value of the shear ring, the fluid acting on the upper side of the annular piston 96 will cause the shear ring to break and the lower mandrel 84 to move downwardly relative to the upper mandrel 81 and the housing 83.

As shown in FIGURE 3, this downward shifting of the lower mandrel moves the seal 90 on the upper end of the mandrel 84 below the port 87 in the upper mandrel 81. When weight was applied to the tool string to set the packer etc., the port 87 in the upper mandrel 81 was moved downwardly relative to the housing into alignment with the port 85 in the housing. The present movement of the lower mandrel seal 90 below port 87 permits fluid communication between the exterior of the tool housing and the interior bore of tubing string above the indicator sub 22. Therefore, pressure having been applied to the annular space in the well, such pressure is communicated suddenly to the interior of the tubing to provide a pressure wave or pressure build up at the surface to indicate that the indicator sub has operated. This, in turn, is indicative that the upper chamber 18 of the tool has filled and provides a means for measuring the time period that lapses between the opening of the test valve 16 and the filling of the upper chamber 18. Since the volume of chamber 18 is known, the rate of fluid flow can readily be calculated.

Subsequent to the above described operation of the indicator sub, pressure in the upper chamber 18 and tool string continues to build up due to the formation pressure communicating therewith. Referring to FIGURE 5, the lower sleeve valve 27 in the valve mechanism 21 is secured to the housing by means of one or more shear pins 39. The shear pin 39 is designed to be sheared by a pressure greater than that necessary to shear the ring 106 to operate the indicator sub 22. The increase in pressure within the upper chamber 18 is also in communication with the lower end of the lower sleeve valve 27 causing the valve to shear the pin 39 and move upwardly within the bore 28 of valve housing 26. Such upward movement of the sleeve valve 27 places seal means 37 and 38 thereon into a position straddling the flow ports 31 in the housing 26. The upward movement of sleeve valve 27 also places ports 36 in the downwardly extending portion 32 of the valve housing in communication with bore 33 in sleeve valve 27. The opening of ports 36 permits formation fluid entering the tool to flow upwardly through passageways 34, 41 and 42 in the valve housing and into the lower end of sample chamber 63 below piston 53.

When the tool is in condition for being operated, the lower chamber 63 in the lower sampling section is filled with water between the piston and the intermediate section 61 separating the upper and lower chambers 62 and 63 therein. The upper chamber is filled with air with the choke 66 between chambers 62 and 63 restricting flow of water from chamber 63 into chamber 62 during the operation of the tool. Therefore, fluid entering the sample chamber on the lower side of the piston 53 pushes the piston upwardly against the water cushion in the lower chamber above the piston 53. The choke 66 between the chambers 62 and 63 provides a back pressure against the movement of the piston 53 which in turn maintains a back pressure against fluids flowing out of the formation during this portion of the test. It is readily seen that the size of the choke 66 between the air and water chambers may be regulated to adjust the back pressure to be applied against the formation during the flow into sampler 19. As the piston 53, moving upwardly in the chamber 63, reaches the top of its stroke, the wire 54 attached thereto is tensioned to lift the upper sleeve valve 47 relative to the upwardly extending portion 43 of the valve housing. This upward movement of the sleeve valve 47 causes seal means 48 and 49 on the upper sleeve valve to straddle ports 46. This in turn closes the ports 46 from communication with the lower end of the sample chamber 63 to trap the recovered fluid therein under the pressure at which it was received within the chamber.

Referring now to FIGURES 6 and 7 of the drawings, it is seen that as the piston 53 moves upwardly in chamber 63 to lift sleeve valve 47 (FIGURE 5) and thereby close the lower end of the chamber, the piston 53 engages the lower end of the intermediate section 61 which separates the chambers 62 and 63. First contact of the intermediate section with the piston is made by the transfer mandrel 69 protruding downwardly from the intermediate section. The transfer mandrel 69 engages the piston valve 58 in the upper end of piston 53 and moves the piston 58 downwardly within the piston 53 until the upper end of the piston 53 seats against the annular seating flange 76. At this point, the transfer mandrel has extended sufficiently into the upper end of the piston 53 to move the piston valve downwardly to a position exposing the ports 60a connecting with passageway 60 within the piston 53. Such opening of the ports 60a places the sample chamber 63 in communication with the passageway 71 within intermediate section 61. Upon retrieval of the tool string to the surface, this permits the bleeding of pressure from the sample chamber through the plugged port 72 by operation of valve 73 which opens and closes passageway 71.

Knowing the time that was taken to fill the upper sample chamber 18, the relative time required to fill the lower sample chamber 19 may be calculated so that it is approximately known when the lower chamber should become filled and automatically closed as set forth above. FIGURE 4 shows the lower chamber closed to take a final shut-in pressure recording of the formation. At the completion of the final shut-in period, the tester valve is closed, the packer is unset, and the tool string is recovered from the well bore.

In the event that an indication is not received at the surface that the indicator valve 22 has opened, it may be assumed that there was not sufficient formation pressure to fill the upper sample chamber. In such case, the test valve 16 is closed to trap the last flowing sample within a sample chamber 16a in the test valve. A final shut in is then taken and subsequently the string of tools is removed from the well bore.

As the string of tools is brought to the surface and uncoupled, each of the tight-hole subs between sections of pipe and tools is closed from the exterior of the tool. The closure of the longitudinal passage in each tight-hole sub closes the ends of the sections of pipe or tools and prevents the fluid content therein from being disclosed at the surface. The tools and sections of pipe forming the upper sample chamber may then be removed from the well site for examination in privacy. In the event extreme secrecy is required, grease or other suitable fluid may be injected into the sub through the exterior passageway (not shown) to displace or mix with fluid which may be trapped between the valves of adjacent tight-hole subs. Such a procedure is set forth in U.S. Patent No. 3,254,710.

An alternative arrangement for tight-hole testing may be provided by placing a reverse circulating valve at the lower end of the upper sample chamber 18. The circulating valve may be activated by a drop bar which is released at the upper end of the upper sample chamber as the upper end of the sample chamber is brought to the surface. Upon the opening of the reverse circulating valve, pressure may be applied to the annular space in the well bore to reverse fluids out of the upper sample chamber into a closed container. This method maintains the secrecy of the fluids contained within the sample chamber and also prevents the spillage of formation fluids at the surface for reasons of safety or cleanliness.

When the tool section containing the lower sample chamber 19 has been retrieved to the surface, the sample chamber 19 is removed from such section by applying a tool to the head 25 of the section and unthreading the section at its lower end for removal from the housing 20. Before removing the sampler section, fluids in the lower end thereof, below sleeve valve 27, may be drained by means of the valve 17a which is shown in FIURE 5B. Of course, if secrecy is desired, the fluids may be drained into a closed container. Likewise, any fluids which are in the annular space 30 between the sample section housing 26 and the tool housing 20 may be drained therefrom by means of the valved passage 35 which is shown in FIGURE 5A.

After removal of the sample section 19 from the tool at the surface, fluids in the lower sample chamber 63 thereof are removed in the following manner: Referring to FIGURE 5C, a plug accessible from the exterior of the sample section covers a passageway 45r communicating with sample chamber 63 by means of vertical passageway 40. A closed container may be connected with the passagewawy 45 and then the valve shown in FIGURE 5C is opened to place the closed container and sample chamber in communication. Since draining the fluids from the sample chamber by gravity may be a very time consuming operation, means are provided for speeding up the operation. Referring to FIGURES 6 and 6A, a pressure source is attached to passageway 68 by removal of the plug therefrom. Such pressure source may be in the form of a $CO_2$ bottle. Upon application of pressure to the passageway, such pressure is communicated through the passageway 67 to the upper end of pistton 53. This pressure forces the piston 53 downward within the sample chamber 63 causing fluids to be expelled from the opposite end of chamber 63 through the passageways 40 and 45 and into a closed chamber. Of course, before the draining operation is attempted, pressure may be bled off from the sample chamber by means of the passageway covered by plug 72, which passageway communicates with passageway 71 and the interior of the sample chamber.

In the event any gas may have leaked by the segregating piston 53 into the upper chamber 62, a valve means 25a at the upper end of the upper chamber may be opened to bleed off any gas in the upper chamber. This gas may be measured to maintain the known quantity of hydrocarbons within the sample chamber for determining accurate gas oil ratios, etc.

While particular embodiments of the present invention have been shown and described, it is apparent that changes and modifications may be made without departing from this invention in its broader aspects and, therefore, the aim in the appended claims is to cover all such changes and modifications as fall within the true spirit and scope of this invention.

What is claimed is:

1. In a string of tools for drill stem testing in a well bore, packer means for sealing off a section of a well bore, test valve means for selectively permitting the flow of formation fluid from the sealed off section, a first fluid receiving chamber formed by one or more sections of pipe, said first chamber having a closed upper end, a second fluid receiving chamber, passage means for communicating both of said fluid receiving chambers with said test valve means, and a valve mechanism in said passage means for initially closing one of said fluid receiving chambers while opening the other of said fluid receiving chambers to the flow of formation fluids and for subsequently opening said one chamber while closing said other chamber to the flow of formation fluids.

2. The apparatus of claim 1 wherein said valve mechanism includes a valve element movable between spaced positions, and releasable means operable in response to the development of a predetermined pressure within said one of said fluid receiving chambers to enable movement of said valve element between said spaced positions.

3. The apparatus of claim 1 and further including indicator means in said string of tools for providing an indication at the earth's surface when a predetermined fluid pressure has been developed in one of said chambers due to flow of formation fluids thereinto.

4. The apparatus of claim 3 wherein said indicator means includes telescoping members which are releasably held in a first position to be released for movement to a second position in response to fluid occupying said one of said fluid receiving chambers.

5. The apparatus of claim 1 wherein one of said fluid receiving chambers is provided with means for restricting the flow of fluids thereinto so that said fluid is received in said one chamber under a controlled back pressure.

6. The apparatus of claim 1 and further including a first normally open valve means in said passage means, said valve means having an actuator exposed to the exterior of said string of tools so that said passage means can be closed from the exterior of said string of tools.

7. The apparatus of claim 1 and further including second valve means for opening the upper ends of said chambers to the exterior of said string of tools to enable removal of fluid samples which have collected in said sample chambers.

8. A string of testing tools adapted to be lowered into a well bore on a pipe string, including packer means for sealing off a section of the well bore, tester valve means responsive to manipulation of the pipe string for selectively permitting the flow of formation fluid from said sealed off section into the interior of said string of testing tools, first and second fluid receiving chambers above said tester valve means, means closing each of said fluid receiving chambers from the pipe string thereabove, passage means and valve means for communicating both of said fluid receiving chambers with said tester valve means, one of said closing means including indicator means for providing a surface indication that the pressure of fluids in one of said fluid receiving chambers has reached a predetermined value.

9. A string of testing tools adapted to be lowered into a well bore on a pipe string, including packer means for sealing off a section of the well bore, tester means responsive to manipulation of the pipe string for selectively permitting the flow of formation fluid into the interior of said testing tools, first and second fluid receiving chambers, passage means for flowing formation fluids into said chambers, first valve means for alternately communicating said fluid receiving chambers with said passage means, and second valve means in said passage means and having a control portion exposed to the exterior of said string of tools for selectively closing said passage means.

10. In a well tester apparatus adapted to be lowered into a well bore on a pipe string having packer means for isolating a formation to be tested, means for obtaining samples of fluids including a housing, first and second fluid receiving chambers in said housing, means for selectively opening said chambers to the flow of formation fluids, and pressure responsive means between the pipe string and said housing for providing a surface indication that a predetermined fluid pressure has developed in one of said chambers.

11. The apparatus of claim 10 and further including means for admitting formation fluids into the other of said chambers under controlled back pressure.

12. In a well tool for obtaining samples of fluids in a well bore, a housing, a fluid receiving chamber in said housing, valve means for opening said chamber to the flow of fluids, means for restricting the flow of fluids entering said chamber to provide a controlled back pressure against fluid flowing into said chamber, and pressure responsive means for providing an indication at the earth's surface of the approximate time when said valve means opens said chamber.

13. In a well tool for obtaining samples of fluids in a well bore, a housing, an initially closed fluid receiving chamber in said housing, valve means for opening said chamber to the flow of fluids, whereby the flow of fluids into said chamber will generate a fluid pressure therein, and means for providing a surface indication while the fluids are flowing into said chamber that the said fluid pressure in said fluid receiving chamber has reached a predetermined level.

14. In a well tool for use in a well bore, a housing, a fluid receiving chamber in said housing, a sleeve on said housing and movable relative to said housing, port means in said housing, means responsive to the movement of said sleeve relative to said port for providing a surface indication that fluid pressure in said chamber has reached a predetermined level, means for releasably holding said sleeve from movement relative to said port, and means responsive to the fluid pressure reaching a predetermined level for releasing said holding means.

15. The apparatus of claim 14 and further including a valve for selectively permitting the flow of fluid into said fluid receiving chamber.

16. In a well tool for use in well bore, a housing, a fluid receiving chamber in said housing, a pair of telescoping members on said housing, at least one of said members being movable between first and second positions, means for releasably holding said telescoping members in one of said positions, means responsive to the filling of said chamber for releasing said holding means, an interior bore in one of said telescoping members, a port on said one of said telescoping members for communicating the interior bore of said member with the exterior of said member, seal means on one of said members for isolating said port when said members are in one of said positions and for opening said port when said members are in the other of said positions, and means responsive to the opening of said port for providing a surface indication that fluid pressure in said chamber has reached a selected level.

17. A method of drill stem testing in a well bore comprising the steps of: packing off a section of a well bore to isloate earth formations traversed by the well bore, opening a test valve in a string of tools to permit the flow of fluids from the isolated earth formations into a first fluid receiving chamber, closing off the flow of fluid into said first fluid receiving chamber in response to the pressuring of such chamber to a selected level, opening a second fluid receiving chamber to the flow of said fluids from the isolated earth formations after the closing of said first fluid receiving chamber, and then closing the second fluid receiving chamber to trap formation fluids therein under flowing conditions.

18. The method of claim 17 and further including the step of closing the test valve in the string of tools to prevent the flow of formation fluids from the formation.

19. The method of claim 17 and further including the step of providing an indication to the earth's surface that the fluid pressure in the first fluid receiving chamber has reached a predetermined value.

20. The method of claim 18 and further including the steps of retrieving the first and second fluid receiving chambers to the earth's surface, and removing the fluids from such first and second chambers into closed receptacles.

21. The method of claim 18 wherein the first fluid receiving chamber is comprised of at least one section of drill pipe and further including the steps of retrieving the string of tools to the surface, and isolating the fluids received in said at least one section of drill pipe to prevent the exposure of such fluids at the earth's surface.

22. A method of drill stem testing in a well bore wherein a test valve and a sample chamber are suspended in the well bore on a string of pipe, comprising the steps of: circulating well fluid through a circulation port between the string of pipe and the well annulus prior to testing a formation to determine the fluid pressure necessary to maintain circulation, at least partially closing the circulation port, applying a fluid pressure to the inside of the string of pipe which is in excess of said circulation pressure, opening the test valve to permit formation fluids to flow into the sample chamber, automatically opening the circulation port in response to the fluid pressure in the sample chamber reaching a selected level, and observing the change in fluid pressure in the string of pipe when said circulation port is opened.

23. A method of drill stem testing in a well bore comprising the steps of lowering a packer, a test valve, and a sample chamber into a well bore on a string of pipe, setting the packer to isolate earth formations, opening the test valve to permit the flow of fluids into the sample chamber, signalling to the earth's surface the information that fluid pressure in the sample chamber has reached a predetermined level, and then closing the test valve.

24. The method of claim 23 and further including the steps of unsetting the packer, retrieving the sample chamber to the earth's surface, and removing the fluids from the sample chamber into a closed receptacle.

25. An indicator apparatus for use in a well bore, including a pair of telescoping tubular members movable between first and second positions relative to each other, a circulation port in one of said members communicating the bore of said member with the well annulus, means for connecting said members with a string of pipe, a valve element movable between a position closing said circulation port when said members are in one of said positions, and a position opening said port, means for releasably holding said valve element in said position closing said port, and means responsive to fluid pressure in the string of pipe for releasing said holding means and for moving said valve element to said position opening said port.

26. Apparatus for use in drill stem testing in a well bore including packer means on a string of pipe for isolating a formation in the well bore, a sample chamber in said string of pipe for trapping a sample of formation fluids, test valve means operable in response to manipulation of the string of pipe for selectively communicating said sample chamber with the formation fluids, and pressure responsive means for signalling to the earth's surface that fluid pressure in said sample chamber has reached a predetermined level.

27. The apparatus of claim 26 and further including a valve sub at the upper end of said sample chamber, said valve sub having a vertically extending passageway therethrough and valve means for opening and closing said vertically extending passageway.

28. The apparatus of claim 27 wherein said valve sub has a laterally extending passageway intersecting said vertical passageway and extending to the exterior of the string of pipe, and further including valve means for opening and closing said laterally extending passageway.

References Cited

UNITED STATES PATENTS

| | | | |
|---|---|---|---|
| 2,441,894 | 5/1948 | Mennecier | 73—151 |
| 2,781,663 | 2/1957 | Maly et al. | 73—151 |
| 2,941,405 | 6/1960 | Southwick | 73—155 |
| 3,152,639 | 10/1964 | Pearcy | 73—151 |
| 3,254,531 | 6/1966 | Briggs | 73—155 |

RICHARD C. QUEISSER, *Primary Examiner.*

JERRY W. MYRACLE, *Assistant Examiner.*

U.S. Cl. X.R.

166—3